(12) United States Patent
Roessler

(10) Patent No.: US 7,712,025 B2
(45) Date of Patent: May 4, 2010

(54) DOCUMENT OBJECT MODEL CACHING AND VALIDATION

(75) Inventor: Andreas Roessler, Sulzfeld (DE)

(73) Assignee: SAP Aktiengesellschaft, Walldorf (DE)

( * ) Notice: Subject to any disclaimer, the term of this patent is extended or adjusted under 35 U.S.C. 154(b) by 1169 days.

(21) Appl. No.: 10/677,121

(22) Filed: Sep. 30, 2003

(65) Prior Publication Data

US 2004/0123239 A1 Jun. 24, 2004

Related U.S. Application Data

(60) Provisional application No. 60/415,600, filed on Oct. 1, 2002.

(51) Int. Cl.
*G06F 17/00* (2006.01)
*G06F 17/20* (2006.01)

(52) U.S. Cl. ............... 715/234; 711/118; 711/122; 715/239; 715/760; 715/762

(58) Field of Classification Search ............ 715/513, 715/762, 234, 239; 711/118, 122
See application file for complete search history.

(56) References Cited

U.S. PATENT DOCUMENTS

| | | | | |
|---|---|---|---|---|
| 6,185,625 B1 * | 2/2001 | Tso et al. | ............ | 709/247 |
| 6,249,291 B1 * | 6/2001 | Popp et al. | ............ | 345/473 |
| 6,249,844 B1 * | 6/2001 | Schloss et al. | ............ | 711/122 |
| 6,519,617 B1 * | 2/2003 | Wanderski et al. | ............ | 715/235 |
| 6,611,876 B1 * | 8/2003 | Barrett et al. | ............ | 709/246 |
| 6,635,089 B1 * | 10/2003 | Burkett et al. | ............ | 715/513 |
| 6,668,354 B1 * | 12/2003 | Chen et al. | ............ | 715/255 |
| 6,671,853 B1 * | 12/2003 | Burkett et al. | ............ | 715/513 |
| 6,675,230 B1 * | 1/2004 | Lewallen | ............ | 719/328 |
| 6,725,424 B1 * | 4/2004 | Schwerdtfeger et al. | ............ | 715/513 |
| 6,745,208 B2 * | 6/2004 | Berg et al. | ............ | 707/201 |
| 6,757,708 B1 * | 6/2004 | Craig et al. | ............ | 709/203 |
| 6,826,726 B2 * | 11/2004 | Hsing et al. | ............ | 715/513 |
| 6,865,599 B2 * | 3/2005 | Zhang | ............ | 709/218 |
| 6,950,831 B2 * | 9/2005 | Haley | ............ | 707/104.1 |
| 6,976,211 B2 * | 12/2005 | Lection et al. | ............ | 715/514 |
| 7,020,882 B1 * | 3/2006 | Lewallen | ............ | 719/328 |

(Continued)

FOREIGN PATENT DOCUMENTS

EP 1221661 7/2002

(Continued)

OTHER PUBLICATIONS http://ww.w3.org/TR/2001/WD-xforms-20010216/rpm.html Feb. 2001.*

(Continued)

*Primary Examiner*—Steven B Theriault
(74) *Attorney, Agent, or Firm*—Fish & Richardson P.C.

(57) ABSTRACT

Methods and apparatus, including computer program products, implementing techniques for document object model caching and validation. A client identifies a change of a user interface (UI) element that references a node of the DOM hierarchy. The client determines whether the change of the UI element can be applied to the DOM hierarchy by using an update function, for example, a delta renderer. If so, the client finds in the DOM hierarchy the node that is referenced by the UI element and modifies at least one attribute related to the node according to the change by using the update function. Otherwise, the client sets a dirty flag.

13 Claims, 4 Drawing Sheets

U.S. PATENT DOCUMENTS

| | | | | |
|---|---|---|---|---|
| 7,051,276 | B1* | 5/2006 | Mogilevsky et al. | 715/517 |
| 7,085,759 | B2* | 8/2006 | Kingham et al. | 707/4 |
| 7,096,418 | B1* | 8/2006 | Singhal et al. | 715/501.1 |
| 7,100,112 | B1* | 8/2006 | Winser | 715/538 |
| 7,130,851 | B1* | 10/2006 | Brown et al. | 707/7 |
| 2001/0034771 | A1* | 10/2001 | Hutsch et al. | 709/217 |
| 2001/0037490 | A1* | 11/2001 | Chiang | 717/2 |
| 2002/0083073 | A1* | 6/2002 | Vaidya et al. | 707/102 |
| 2002/0133627 | A1* | 9/2002 | Maes et al. | 709/246 |
| 2002/0143659 | A1* | 10/2002 | Keezer et al. | 705/27 |
| 2002/0165870 | A1* | 11/2002 | Chakraborty et al. | 707/206 |
| 2002/0184264 | A1* | 12/2002 | Berg et al. | 707/513 |
| 2002/0184340 | A1* | 12/2002 | Srivastava et al. | 709/219 |
| 2002/0184444 | A1* | 12/2002 | Shandony | 711/118 |
| 2002/0194388 | A1* | 12/2002 | Boloker et al. | 709/310 |
| 2003/0001893 | A1* | 1/2003 | Haley | 345/762 |
| 2003/0007009 | A1* | 1/2003 | Haley | 345/805 |
| 2003/0009563 | A1* | 1/2003 | Douglis et al. | 709/227 |
| 2003/0149934 | A1* | 8/2003 | Worden | 715/513 |
| 2003/0189593 | A1* | 10/2003 | Yarvin | 345/762 |
| 2004/0001476 | A1* | 1/2004 | Islam et al. | 370/352 |
| 2004/0015537 | A1* | 1/2004 | Doerksen et al. | 709/203 |
| 2004/0021679 | A1* | 2/2004 | Chapman et al. | 345/700 |
| 2004/0088415 | A1* | 5/2004 | Chandrasekar et al. | 709/226 |
| 2004/0111416 | A1* | 6/2004 | Kingham et al. | 707/10 |
| 2005/0015732 | A1* | 1/2005 | Vedula et al. | 715/805 |
| 2005/0027823 | A1* | 2/2005 | Rana | 709/219 |
| 2005/0131962 | A1* | 6/2005 | Deshpande | 707/201 |
| 2006/0107206 | A1* | 5/2006 | Koskimies | 715/523 |
| 2006/0200535 | A1* | 9/2006 | Moser | 709/217 |
| 2006/0294500 | A1* | 12/2006 | Chiang | 717/109 |
| 2007/0112714 | A1* | 5/2007 | Fairweather | 706/46 |
| 2007/0125859 | A1* | 6/2007 | Alleshouse | 235/462.01 |

FOREIGN PATENT DOCUMENTS

WO  WO 01/57718  8/2001

OTHER PUBLICATIONS

Robie, Jonathan, et al. "What is the DOM" 1998, http://www.w3.org/TR/1998/REC-DOM-LEVEL1-19984001/introduction.html.*

Danny Goodman: "Javascript Bible (3rd Edition)" XP002191625 Retrieved from the Internet: <URL: http://developer.netscape.com/docs/books/i dg/jsbible/jsbible13.pdf> [retrieved on Feb. 25, 2002] * p. 143-p. 146; figure 13.1*.

Communication of EP Search Report for EP Application No. EP 0206855.3-2201; 3 pages mailed Mar. 1, 2004.

International Search Report of PCT/EP03/10441; 2 pages mailed Mar. 1, 2004.

Official Communication of Office Action for EP Application No. EP 02026855.3-2201; 5 pages mailed Nov. 4, 2004.

Official Communication of Office Action for EP Application No. EP 02026855.3-2201; 6 pages mailed Apr. 11, 2005.

Official Communication of Office Action for EP Application No. EP 02026855.3-2201; 6 pages mailed Aug. 3, 2005.

Official Communication of Office Action for EP Application No. EP 02026855.3-2201; 4 pages mailed Feb. 17, 2006.

Summons to Attend Oral Proceedings for EP Application No. EP 02026855.3-2201; 8 pages mailed Feb. 27, 2007.

Telefax Opinion for EP Application No. EP 02026855.3; 5 pages mailed Jun. 6, 2007.

* cited by examiner

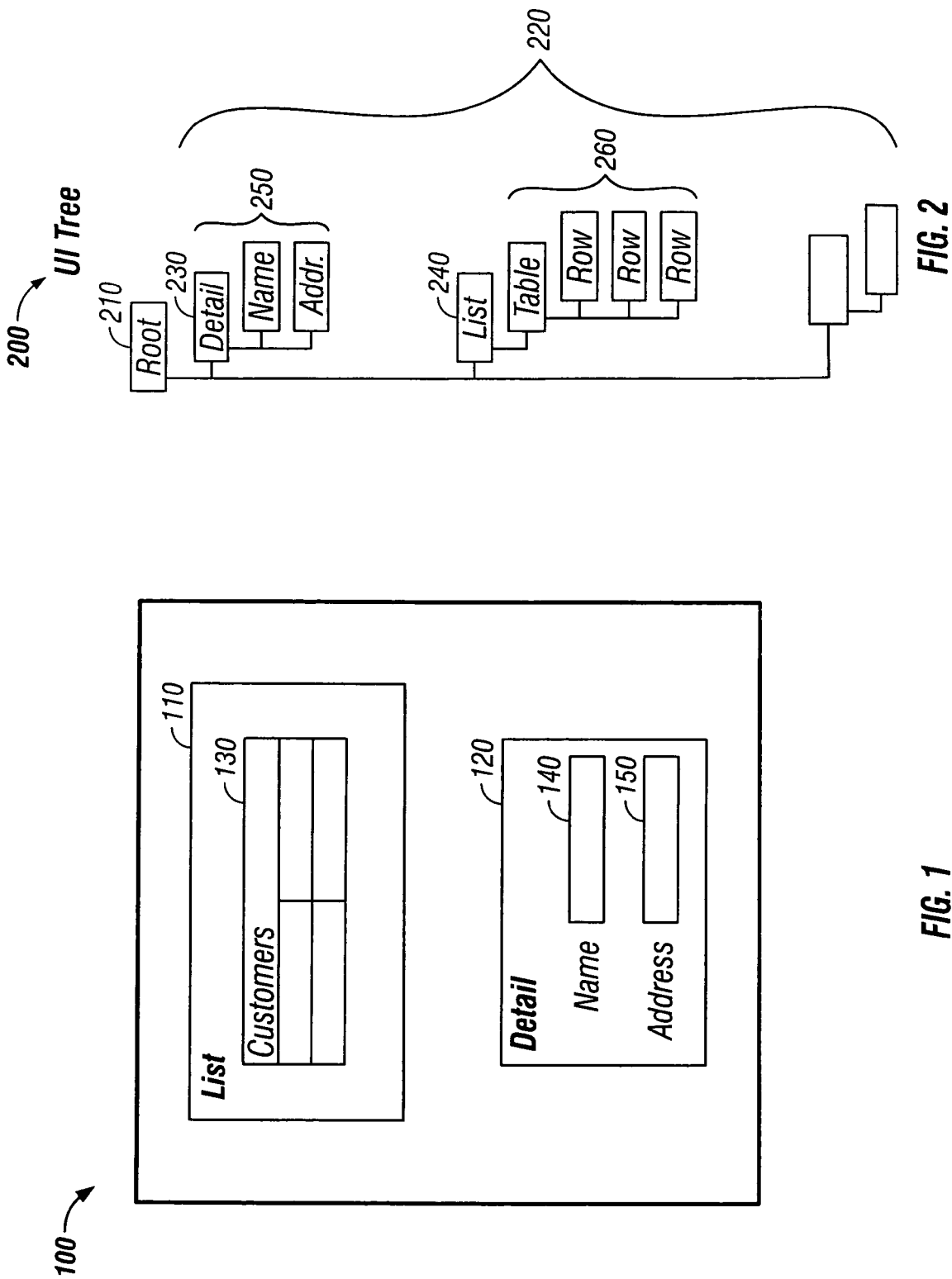

DOCUMENT OBJECT MODEL CACHING AND VALIDATION

CROSS-REFERENCE TO RELATED APPLICATIONS

This application claims the benefit of U.S. Provisional Application No. 60/415,600, filed Oct. 1, 2002, which is incorporated by reference herein.

BACKGROUND

The present invention relates to data processing by digital computer, and more particularly to document object model caching and validation.

Computers can communicate through the use of various Internet technologies. For example, a server computer can send "pages" to a client computer. In this specification, pages are also referred to as user interface (UI) pages. Such pages typically include instructions in a markup language (e.g., Hypertext Markup Language (HTML)), and/or in a script language (e.g., JavaScript). The client computer can use a Web browser to interpret the pages and thereby provide screen presentations to a user. The appearance of the screen presentations can change upon the occurrence of various events—e.g., when the user interacts with or navigates through various UI elements of a page, when the user enters data, or when the server computer updates a page.

Ensuring adequate performance of applications that require client-server communication can be challenging because of numerous limitations, including: limitations in communication speed and the bandwidth that is available, the time required for client-server roundtrips, and the time-consuming computations required to provide the screen presentations (rendering) at the client computer in cases where the client computer is responsible the rendering.

Various techniques can be used to alleviate the problems created by such limitations. For example, layout (e.g., arrangement of elements on screen), style (e.g., fonts, colors), and content (e.g., text messages or pictures) can be transmitted to a client separately. A browser can combine the appropriate layout, style, and content at the time of presentation. However, requests from the client to the server for presentation updates may still require client-server communication (in both directions, so-called roundtrips).

Applications that are built according to the model-view-controller (MVC) design methodology provide views that present an application model to a user. The user can interact with the views, causing a corresponding controller to manipulate the model. The model can then update its views as appropriate. A UI page of an application can include multiple views. The structure of a UI page can be described as a UI tree structure, where the root node of the tree represents the UI page, and child nodes represent UI elements included in the page. The UI elements can include one or more views and one or more controls through which a user interacts with, provides input to, and/or controls the application. Some examples of controls are text fields, radio buttons, tables, trays, and drop-down menus. Each node can have further child nodes (for example, to represent nested views).

An application running on a server computer can send a UI page with markup language portions that describe the UI elements of a UI page to a client computer with a browser. The client can parse the markup language portions of the UI page and build a document object model (DOM) of the UI page. The DOM (e.g., HTML DOM) can include nodes in a DOM hierarchy that represent the UI elements of the UI page in the browser. The browser presents a screen presentation of the UI page that corresponds to the DOM.

When a request is triggered (e.g., by a user interaction, or an interaction with another computer system) that results in a change to a UI element (e.g., a new data value or background color for the UI element), typically, the whole UI page is re-rendered. This can cause unpleasant effects for the user. For example, the user may have to wait for the entire DOM to be regenerated, and when the new DOM is finally presented, it can cause the browser screen to flicker.

SUMMARY OF THE INVENTION

The present invention provides methods and apparatus, including computer program products, implementing techniques for document object model caching and validation.

In general, in one aspect, the techniques include identifying a change of a user interface (UI) element that references a node of a document object model (DOM) hierarchy; determining whether the change of the UI element can be applied to the DOM hierarchy by using an update function; if the change can be applied by using the update function, finding in the DOM hierarchy the node that is referenced by the UI element and modifying at least one attribute related to the node according to the change by using the update function; and else, setting a dirty flag.

Advantageous implementations of the invention include one or more of the following features. The update function is a delta renderer. The dirty flag indicates invalidity of a cached DOM representation of the UI element. The dirty flag indicates invalidity of a cached DOM representation of a further UI element that is a parent of the UI element.

The cached DOM representation comprises the node, and the at least one attribute is an attribute of the node. The cached DOM representation comprises a sub-hierarchy of the DOM hierarchy and the node is the root node of the sub-hierarchy and the at least one attribute is an attribute of a sub-node of the sub-hierarchy.

In general, in another aspect, the techniques include receiving a request to render a user interface (UI) element of a UI-tree; determining whether a dirty flag is set for a cached document object model (DOM) representation of a flagged UI element that is on the path of the UI element in the UI tree; the flagged UI element having a reference to a node of the DOM hierarchy; if the dirty flag is set, generating a new DOM representation of the flagged UI element and inserting the new DOM representation into the DOM hierarchy by using the UI-tree and the reference to the node; and else, inserting the cached DOM representation into the DOM hierarchy by using the UI-tree and the reference to the node.

Advantageous implementations of the invention include one or more of the following features. The cached DOM representation is a cached sub-tree of the DOM hierarchy and the node is the root node of the cached sub-tree. The new DOM representation is a new sub-tree of the DOM hierarchy and the node is the root node of the new sub-tree.

The invention can be implemented to realize one or more of the following advantages. Modifications to the DOM can be made without re-rendering the entire DOM. This reduces the amount of client-side processing required to re-render a page. The use of DOM caching reduces the frequency of client-server roundtrips. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

FIG. 1 illustrates a UI page.

FIG. 2 illustrates a UI tree.

Like reference numbers and designations in the various drawings indicate like elements.

DETAILED DESCRIPTION

Figure 3:
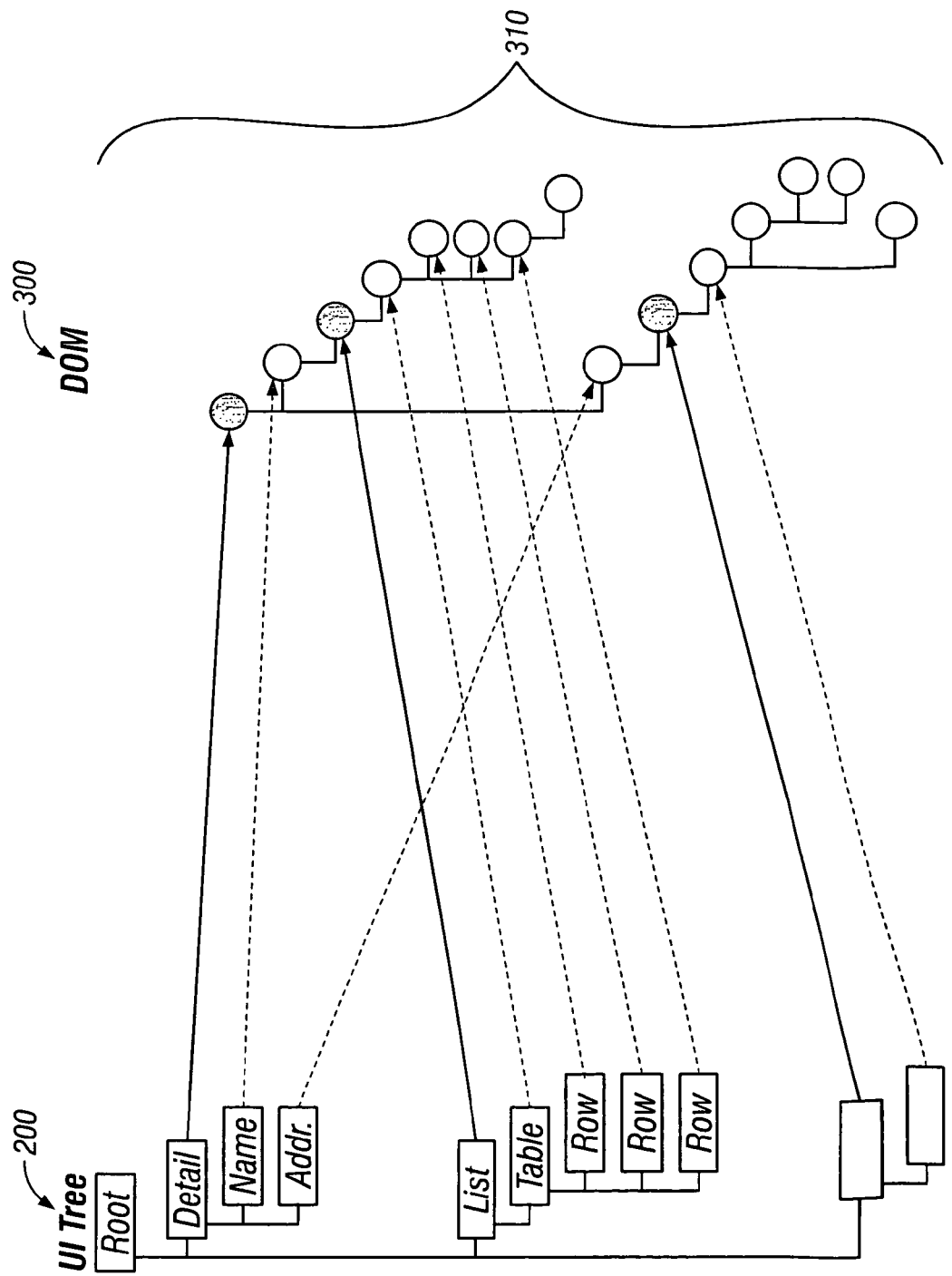
FIG. 3 illustrates a UI tree and a corresponding DOM hierarchy.

Persons of skill in the art can implement a computer system with a server computer ("server") and a client computer ("client") that are controlled by computer programs according to the invention. In one implementation, Dynamic Hypertext Markup Language (DHTML) is used to modify a DOM (e.g., an HTML DOM) to change a presentation dynamically after a UI page has been received and rendered by a browser in the client.

In such an implementation, the server can send browser-compatible instructions to the client to provide a framework that enables the client to render UI elements included in a UI page. Such instructions can be written in a scripting language, such as JavaScript or Visual Basic Script. A browser that supports DHTML can use the framework to manipulate a UI page without the need for server roundtrips if the corresponding content that is needed for the manipulation is already available at the client (e.g., if the content can be stored in an HTML-DOM cache).

FIG. 1 shows a sample UI page 100. A UI page can include multiple UI elements and views. For example, the UI page in FIG. 1 includes a first view LIST 110 and a second view DETAIL 120. Views can include UI elements. For example, the LIST view includes a UI element table control TABLE 130 to list customers, and the DETAIL view includes UI elements first input field NAME 140 and second input field ADDRESS 150 to maintain the name and address of a customer that is selected in the table control.

FIG. 2 shows a UI tree 200 that represents the hierarchical structure of the UI elements contained in the UI page 100. The UI tree has a root node 210 represents the overall page and child nodes 220 that represent the UI elements contained in the page. The child nodes include nodes 230, 240 that correspond to the views (DETAIL, LIST). Each child node 230, 240 has further child nodes 250, 260 that correspond to the nested views and controls (ADDRESS, NAME, TABLE, ROW).

As shown in FIG. 3, the UI tree 200 can reference a DOM hierarchy 300 for the UI page 100. Each child node 220 of the UI tree 200 can be associated with a corresponding node 310 in the DOM hierarchy (shown by the solid and dashed arrows).

Figure 4:
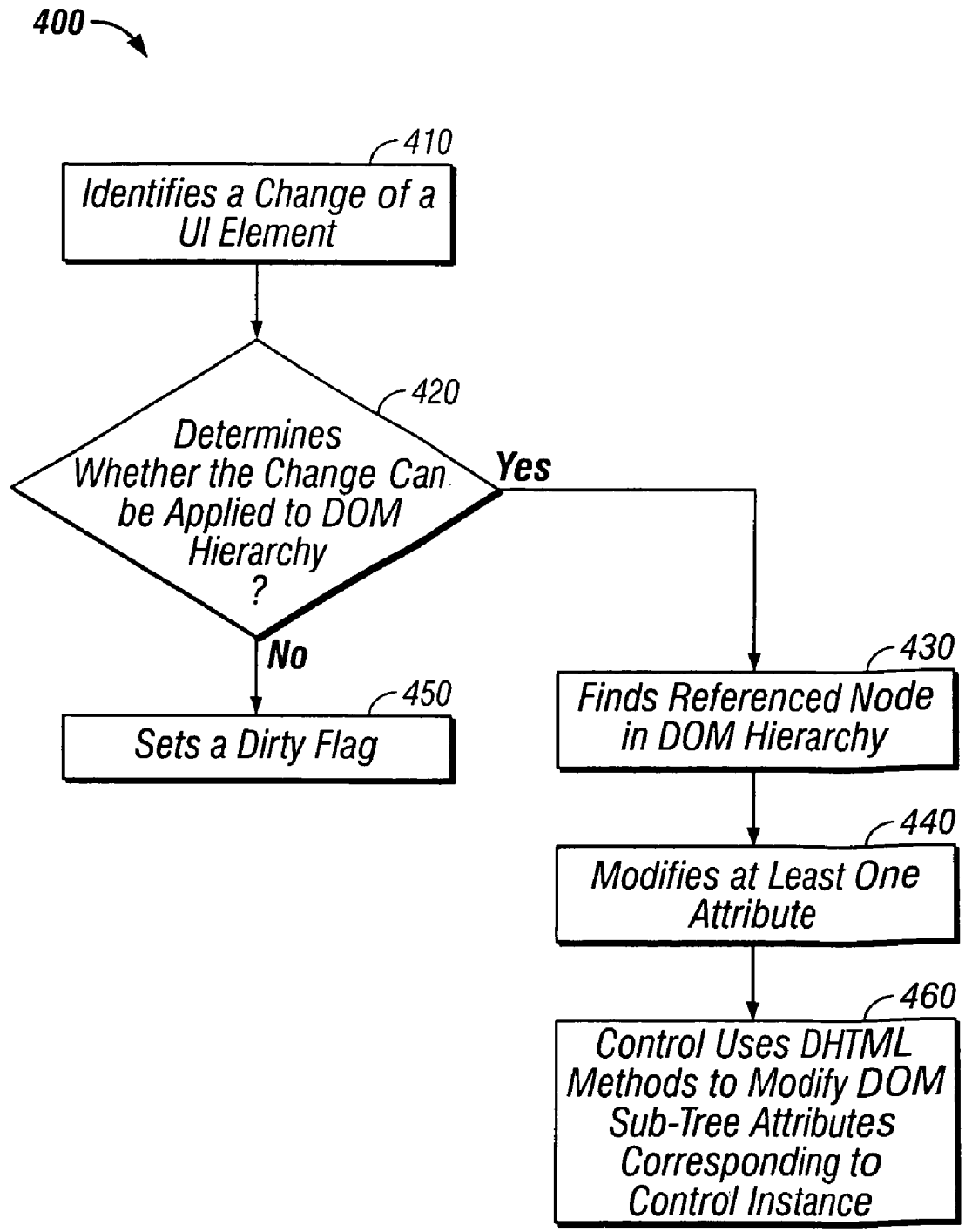
FIG. 4 is a flow diagram of a first method for modifying a DOM hierarchy.

FIG. 4 is a flow diagram of a method 400 for modifying a document object model (DOM) hierarchy in a browser. In method 400, the client identifies (410) a change to a UI element that references a node of the DOM hierarchy. For example, the browser can recognize that a user has modified the address in UI element ADDRESS, thereby changing the value of the UI element, and potentially requiring a change of the background color of the UI element to indicate that the value has been modified.

The client then determines (420) whether the change to the UI element can be applied to the DOM hierarchy by using a delta renderer. A delta renderer is a set of update functions that can modify the DOM representation of a UI element directly by using, for example, setter functions for various attributes of the UI element (e.g., setValue, setMaxLength, setColor, etc.). In one implementation, some, but not all, of the attributes of the UI element have setter functions, and the step of determining whether the delta renderer can be used involves determining whether a setter function is available for the particular attribute that has changed. If there is a function included in the delta renderer that can be used to adjust the DOM hierarchy according to the change, then delta renderer can be used.

If the change can be applied by using a delta renderer, the browser finds (430) in the DOM hierarchy the node that is referenced by the UI element. In the example in FIG. 3, references from view UI elements to the corresponding DOM nodes are shown by solid arrows. References from controls included in the views are shown by dashed arrows. The nodes shaded gray are the nodes referenced by the views. When the DOM node that is referenced by a UI element is identified, the browser modifies (440) at least one attribute related to the node according to the change to the UI element. For example, the value and color attributes of the node referenced by the UI element ADDRESS can be changed by the delta renderer. To accomplish this, a delta renderer can provide a corresponding setValue and setColor function. By applying the changes directly to the corresponding nodes of the DOM hierarchy, a complete re-generating (re-rendering) of the changed UI element is not necessary. In particular, a control can use (460) DHTML methods to modify DOM sub-tree attributes corresponding to a control instance.

Depending on the complexity of a UI element, its DOM representation can include a node as well as a sub-tree of the DOM hierarchy (the node being the root node of the sub-tree). If the UI element is represented by a node, the attributes that are changed (e.g., value, color) are attributes of the node. If the UI element is represented by a DOM sub-tree, the attributes that are changed can include attributes of any of the DOM nodes in the sub-tree.

Continuing with method 400, if the change to the UI element cannot be applied by using a delta renderer, the browser sets (450) a dirty flag. The dirty flag can indicate invalidity of a cached DOM representation of the UI element. For example, in the sample DOM shown in FIG. 3, the dirty flag can be set for the DOM representation of the UI element ADDRESS. The dirty flag can also indicate invalidity of a cached DOM representation of a UI element that is an ancestor of the changed UI element in the UI tree. For example, the dirty flag can be set for a UI element that is the parent of the changed UI element. It can also be set for any further UI element that is on the path from the root node to the changed UI element. For example, instead of setting the dirty flag for the UI element ADDRESS, the dirty flag can be set for the view DETAIL that includes the ADDRESS element.

In one implementation, method 400 can be executed by the client without a need to send data from the server to the client. This can improve application performance and reduce the bandwidth required for communication between the client and server.

Figure 5:
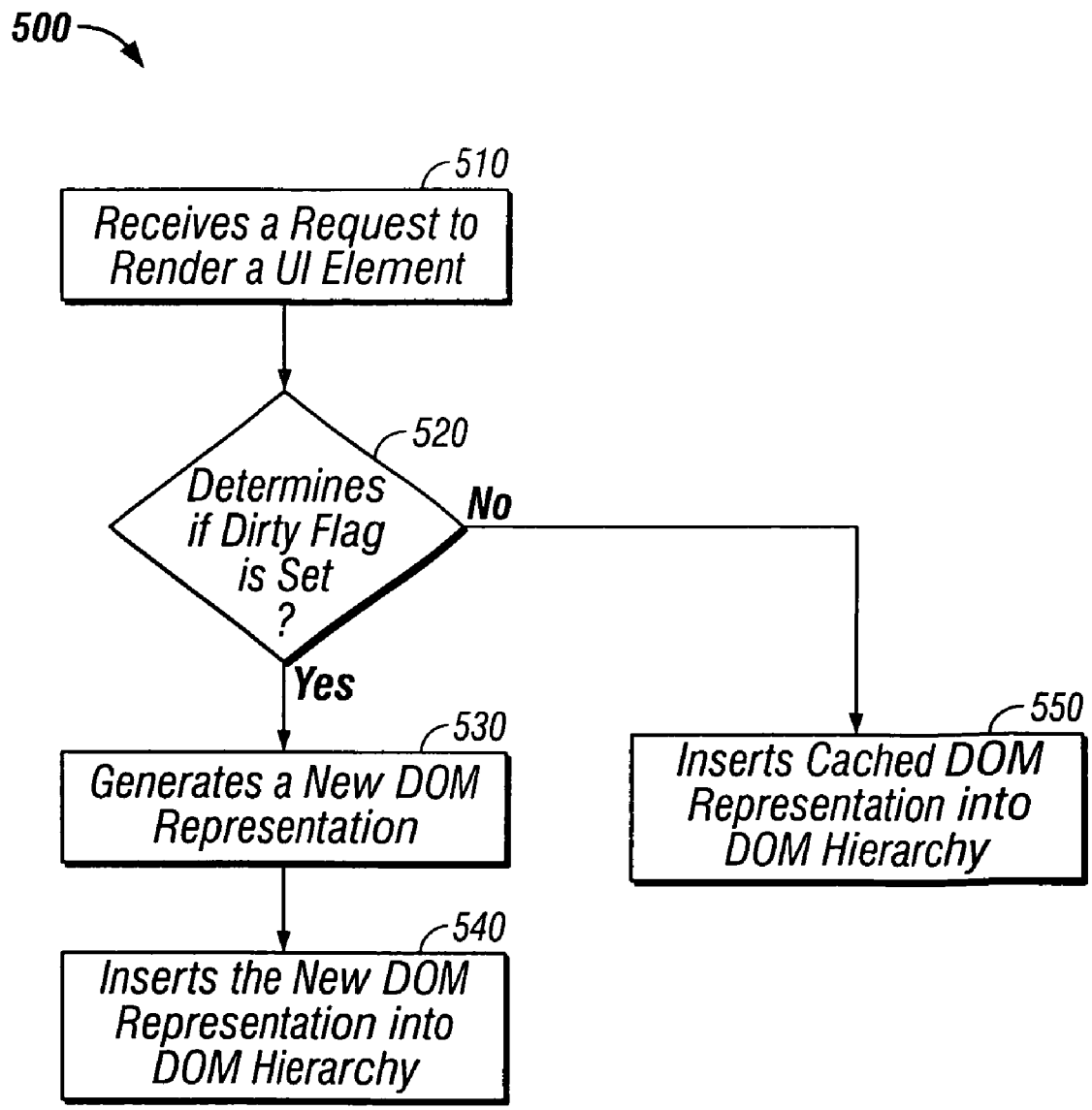
FIG. 5 is a flow diagram of a second method for modifying a DOM hierarchy.

FIG. 5 is a flow diagram of a method 500 for modifying a DOM hierarchy in a browser. In method 500, a client receives (510) a request to render a UI element of a UI tree. The client then determines (520) whether a dirty flag is set for a cached DOM representation of a UI element that is on the path of the UI element to be rendered (an element whose dirty flag is set is referred to as a flagged element). The flagged UI element can have a reference to a node of the DOM hierarchy.

The dirty flag can be set for the UI element to be rendered, or for another UI element that is on the path of the UI element to be rendered. Where the dirty flag is set indicates what portion of the cached DOM representation is invalid. As an example, given a request to render the UI element ADDRESS, the dirty flag may be set for the cached DOM representation of the view DETAIL or for the cached DOM representation of the UI element ADDRESS—in either case, the result of the determining step 520 is that a dirty flag is set.

If the dirty flag is set, the client generates (530) a new DOM representation of the flagged UI element, and inserts (540) the new DOM representation into the DOM hierarchy by using the UI tree and the reference from the flagged UI element to the node in the DOM hierarchy. If the flagged UI element (e.g., view DETAIL) includes further UI elements (e.g., NAME, ADDRESS), the UI tree can be used to evaluate which UI elements belong to the flagged UI element. The new DOM representation can be a new sub-tree of the DOM hierarchy where the node is the root node of the new sub-tree.

If the dirty flag is not set, the client inserts (550) the cached DOM representation into the DOM hierarchy by using the UI tree and the reference to the node. The cached DOM representation can be a cached sub-tree of the DOM hierarchy where the node is the root node of the cached sub-tree.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A computer program product, tangibly embodied in a machine readable storage device, the computer program product comprising instructions operable to cause data processing apparatus to perform operations comprising:

parsing a markup-language file to generate a document object model (DOM) hierarchy, wherein the DOM hierarchy defines attributes of a plurality of user interface (UI) elements for rendering a display page through a Web browser;

presenting, through the Web browser, the display page including a first UI element of the plurality of UI elements based, at least in part, on the DOM hierarchy locally stored on a client computer, wherein at least a child node of the DOM hierarchy defines one or more attributes of the first UI element;

receiving a value from a user of the client computer through the first UI element of the displayed page;

in response to at least receiving the value, identifying in the Web browser in the client computer an update to the one or more attributes of the first UI element, wherein the update modifies presentation of the first UI element;

determining in the browser whether the update to the one or more attributes of the first UI element can be applied to the locally-stored DOM hierarchy independent of receiving an update to the hierarchy from a server;

if the change can be locally applied, automatically modifying the child node in the locally-stored DOM hierarchy, independent of updating the markup-language file, to dynamically update a presentation of the first UI element without re-rendering all of the displayed page; and else, setting a dirty flag.

2. The product of claim 1, wherein the dirty flag indicates invalidity of a cached DOM representation of the UI element.

3. The product of claim 1, wherein the dirty flag indicates invalidity of a cached DOM representation of a further UI element that is a parent of the UI element.

4. The product of claim 2, wherein the cached DOM representation comprises the child node and the one or more attributes are an attribute of the child node.

5. The product of claim 3, wherein the cached DOM representation comprises the child node and the one or more attributes are an attribute of the child node.

6. The product of claim 2, wherein the cached DOM representation comprises a sub hierarchy of the DOM hierarchy and the child node is the root node of the sub hierarchy and the one or more attributes are an attribute of a sub node of the sub hierarchy.

7. The product of claim 3, wherein the cached DOM representation comprises a sub hierarchy of the DOM hierarchy and the child node is the root node of the sub hierarchy and the one or more attributes are an attribute of a sub node of the sub hierarchy.

8. A computer program product, tangibly embodied in a machine readable storage device, the computer program product comprising instructions operable to cause data processing apparatus to perform operations comprising:

parsing a markup-language file to generate a document object model (DOM) hierarchy, wherein the DOM hierarchy defines attributes of a plurality of user interface (UI) elements for rendering a user interface pace through a Web browser;

presenting, through the Web browser, the display pace including a first UI element of the plurality of UI elements based, at least in part, on the DOM hierarchy locally stored on a client computer, wherein at least a child node of the DOM hierarchy defines one or more attributes of the first UI element;

receiving a request to render a user interface (UI) element of a UI tree in a client computer, the UI tree representing in the client computer a hierarchical structure of UI elements contained in the user interface page received in the client computer from a server computer, the UI element being an element of the user interface page;

determining whether a dirty flag is set for a cached DOM representation of a flagged UI element that is on the path of the UI element in the UI tree, the flagged UI element having a reference to a node of the DOM hierarchy, the cached DOM representation being in the client computer, the UI element being different from the flagged UI element;

if the dirty flag is set, generating in the client computer a new DOM representation of the flagged UI element and inserting the new DOM representation into the DOM hierarchy by using the UI tree and the reference to the node; and else, inserting, independent of receiving an update to the DOM hierarchy from a server and independent of updating the markup-language file, the cached DOM representation in the client computer into the DOM hierarchy by using the UI tree and the reference to the node to dynamically update a presentation of the UI element without re-rendering all of the user interface page.

9. The product of claim 8, wherein the cached DOM representation is a cached sub tree of the DOM hierarchy and the node is the root node of the cached sub tree.

10. The product of claim 8, wherein the new DOM representation is a new sub tree of the DOM hierarchy and the node is the root node of the new sub tree.

11. Apparatus comprising:

means for parsing a markup-language file to generate a document object model (DOM) hierarchy, wherein the DOM hierarchy defines attributes of a plurality of user interface (UI) elements for rendering a display page through a Web browser;

means for presenting, through the Web browser, the display page including a first UI element of the plurality of UI elements based, at least in part, on the DOM hierarchy locally stored on a client computer, wherein at least a child node of the DOM hierarchy defines one or more attributes of the first UI element;

means for receiving a value from a user of the client computer through the first UI element of the displayed page;

in response to at least receiving the value, means for identifying in the Web browser in the client computer an update to the one or more attributes of the first UI element, wherein the update modifies presentation of the first UI element;

means for determining in the browser whether the update to the one or more attributes of the first UI element can be applied to the locally-stored DOM hierarchy independent of receiving an update to the hierarchy from a server;

means for, if the change can be locally applied, automatically modifying, independent of updating the markup-language file, the child node in the locally-stored DOM hierarchy to dynamically update a presentation of the first UI element without re-rendering all of the displayed page; and else, setting a dirty flag.

12. The apparatus of claim 11, wherein the dirty flag indicates invalidity of a cached DOM representation of the UI element.

13. Apparatus comprising:

means for parsing a markup-language file to generate a document object model (DOM) hierarchy, wherein the DOM hierarchy defines attributes of a plurality of user interface (UI) elements for rendering a user interface pace through a Web browser;

means for presenting, through the Web browser, the display pace including a first UI element of the plurality of UI elements based, at least in part, on the DOM hierarchy locally stored on a client computer, wherein at least a child node of the DOM hierarchy defines one or more attributes of the first UI element;

means for receiving a request to render a user interface (UI) element of a UI tree in a client computer, the UI tree representing in the client computer a hierarchical structure of UI elements contained in the user interface page received in the client computer from a server computer, the UI element being an element of the user interface page;

determining whether a dirty flag is set for a cached DOM representation of a flagged UI element that is on the path of the UI element in the UI tree; the flagged UI element having a reference to a node of the DOM hierarchy, the cached DOM representation being in the client computer, the UI element being different from the flagged UI element; and means for, if the dirty flag is set, generating in the client computer a new DOM representation of the flagged UI element and inserting the new DOM representation into the DOM hierarchy by using the UI tree and the reference to the node; and else, inserting, independent of receiving an update to the DOM hierarchy from a server and independent of updating the markup-language file, the cached DOM representation in the client computer into the DOM hierarchy by using the UI tree and the reference to the node to dynamically update a presentation of the UI element without re-rendering all of the user interface page.

* * * * *